(12) United States Patent
Huang et al.

(10) Patent No.: US 11,695,289 B2
(45) Date of Patent: *Jul. 4, 2023

(54) ADAPTER AND POWER TOOL SYSTEM

(71) Applicant: Globe (Jiangsu) Co., Ltd, Jiangsu (CN)

(72) Inventors: Lei Huang, Jiangsu (CN); Xinzhong Guo, Jiangsu (CN); An Yan, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,166

(22) Filed: Mar. 20, 2022

(65) Prior Publication Data

US 2022/0209557 A1 Jun. 30, 2022

Related U.S. Application Data

(63) Continuation of application No. 17/120,148, filed on Dec. 12, 2020, now Pat. No. 11,309,726.

(30) Foreign Application Priority Data

Dec. 12, 2019 (CN) .......................... 201911271649.6

(51) Int. Cl.
*H02J 7/00* (2006.01)
*H01R 31/06* (2006.01)
(Continued)

(52) U.S. Cl.
CPC .............. *H02J 7/0044* (2013.01); *B25F 1/00* (2013.01); *B25F 5/00* (2013.01); *H01R 31/06* (2013.01); *H02J 7/0063* (2013.01)

(58) Field of Classification Search
CPC ......... B25F 5/00; B25F 1/00; H01M 2220/30; H01M 50/20; H01M 50/247; H01M 50/502; H02J 7/0045; H02J 7/0044; A01G 20/47
See application file for complete search history.

(56) References Cited

U.S. PATENT DOCUMENTS 11,309,726 B2 * 4/2022 Huang ................... H02J 7/0063
2009/0108806 A1 * 4/2009 Takano ............... H01M 10/441
320/112

FOREIGN PATENT DOCUMENTS

WO    WO-2018012795 A1 *  1/2018  ................ B25F 5/00
WO    WO-2018079724 A1 *  5/2018  ................ B25F 5/00
WO    WO-2018119256 A1 *  6/2018  ................ B25F 5/02

* cited by examiner

*Primary Examiner* — Ryan Johnson

(57) ABSTRACT

An adapter comprises an input port being coupleable with a single-voltage output interface of a single-voltage battery pack or a multi-voltage output interface of a multi-voltage battery pack, an output port electrically connected to the input port and being coupleable with a single-voltage input interface of a first power tool or a multi-voltage input interface of a second power tool, a switching mechanism being switchable between a first state and a second state. When the switching mechanism is in the first state, the input port is coupled with the single-voltage output interface and the output port is coupled with the multi-voltage input interface of the second power tool, when the switching mechanism is in the second state, the input port is coupled with the multi-voltage output interface and the output port is coupled with the single-voltage input interface of the first power tool.

16 Claims, 13 Drawing Sheets

(51) Int. Cl.
*B25F 5/00* (2006.01)
*B25F 1/00* (2006.01)

ADAPTER AND POWER TOOL SYSTEM

CROSS-REFERENCE TO RELATED INVENTIONS

This application is a Continuation application of U.S. patent application Ser. No. 17/120,148 filed on Dec. 12, 2020, which claims the priority of Chinese Patent Application No. 201911271649.6, filed on Dec. 12, 2019, the disclosures of which are hereby incorporated by reference in their entirety.

TECHNICAL FIELD

The invention relates to an adapter and a power tool system with the adapter.

BACKGROUND ART

Generally, different power tools, such as hand-held blowers, hand-held electric drills, and the like, have different rated working voltages, therefore, manufacturers need to configure each power tool with a corresponding battery pack. When there are a various power tools, user must equip with a plurality of battery packs in various specifications. Therefore, maintenance difficulty is increased for user, and a large space is occupied for storing the battery packs. Secondly, different power tools have different usage rates. For example, hand-held blowers are typically used more frequently in autumn and less frequently in other seasons. Moreover, different users have different use frequency for different power tools. For example, some users use the blowers frequently, and use the electric drill occasionally. Therefore, the battery pack matched with the electric drill is in an idle state for a long time, and resource waste is caused.

In order to solve the problems, technician design a battery pack with a multi-voltage output interface, wherein the multi-voltage output interface has multiple coupling states so as to output different voltages through different coupling states, thereby achieving the purpose that the battery pack can be matched with multiple power tools, further improving the utilization rate of the battery pack and reducing the maintenance difficulty for users. However, the output interface disposed on the single-voltage battery pack is not coupleable with the input interface of the power tool mating with the multi-voltage battery pack, the output interface disposed on the multi-voltage battery pack is not coupleable with the input interface of the power tool mating with the single-voltage battery pack. So that the power tool mating with the single-voltage battery pack cannot mate with the multi-voltage battery pack. Furthermore, the power tool mating with the multi-voltage battery pack cannot match with the single-voltage battery pack.

In view of the above, there is a need for an adapter to solve the above problems.

SUMMARY OF INVENTION

The object of the present invention is to provide an adapter, the adapter can connect a multi-voltage output interface of a multi-voltage battery pack with a single-voltage input interface of the power tool, or connect a single-voltage output interface of a single-voltage battery pack with a multi-voltage input interface of the power tool, so that the power tool having single-voltage input interface can couple with the multi-voltage battery pack, and the power tool having multi-voltage input interface can couple with the single-voltage battery pack, thereby expanding use range of the single-voltage battery pack and the multi-voltage battery pack.

In order to achieve the above object, present invention provide an adapter, which comprises an input port being coupleable with a single-voltage output interface of a single-voltage battery pack or a multi-voltage output interface of a multi-voltage battery pack, an output port electrically connected with the input port and being coupleable with a single-voltage input interface of a first power tool or a multi-voltage input interface of a second power tool, the single-voltage output interface of the single-voltage battery pack being coupleable to the single-voltage input interface of the first power tool and not coupleable to the multi-voltage input interface of the second power tool, the multi-voltage output interface of the multi-voltage battery pack being coupleable to the multi-voltage input interface of the second power tool and not coupleable to the single-voltage input interface of the first power tool, a switching mechanism being switchable between a first state and a second state, a housing for accommodating the input port, the output port and the switching mechanism, wherein when the input port is coupled with the single-voltage output interface of the single-voltage battery pack and the switching mechanism is in the first state, the second power tool can be coupled to the output port and powered by the single-voltage battery pack, and when the input port is coupled with the multi-voltage output interface of the multi-voltage battery pack and the switching mechanism is in the second state, the first power tool can be coupled to the output port and powered by the multi-voltage battery pack.

As a further improvement of the present invention, the input port comprises a first input terminal, a second input terminal, a third input terminal and a fourth input terminal which are arranged in sequence.

As a further improvement of the present invention, the switching mechanism comprises a base, and an elastic element engaged with the base, and a connecting terminal arranged on the base; when the elastic element is elastically deformed, the connecting terminal is electrically disconnected from the second input terminal and the third input terminal; when the elastic element resets, the connecting terminal is electrically connected with the second input terminal and the third input terminal.

As a further improvement of the present invention, the switching mechanism comprises a base, an elastic element engaged with the base and a plurality of connecting terminals arranged on the base; the connecting terminals comprise a first connecting terminal and a second connecting terminal; when the elastic element is elastically deformed, the first connecting terminal is electrically disconnected from the first input terminal and the second input terminal, and the second connecting terminal is electrically disconnected from the third input terminal and the fourth input terminal; when the elastic element resets, the first connecting terminal is electrically connected with the first input terminal and the second input terminal, and the second connecting terminal is electrically connected with the third input terminal and the fourth input terminal.

As a further improvement of the present invention, the switching mechanism comprises a base, an elastic element engaged with the base, and a connecting terminal or a plurality of connecting terminals for engaging with the input port, when the elastic element is elastically deformed, the base moves along a mating direction of the input port and the single-voltage output interface or along a vertical direction.

As a further improvement of the present invention, the switching mechanism comprises a button partially positioned outside the housing and a switching terminal mounted on the button and engaged with the input terminal group; when the button is pressed, the switching terminal engages with the second input terminal and the third input terminal under an action of the button so that the second input terminal and the third input terminal are electrically connected.

As a further improvement of the present invention, the switching mechanism comprises a button partially positioned outside the housing and a plurality of switching terminal which is arranged on the button and engaged with the input terminal group; the switching terminals comprise a first switching terminal and a second switching terminal; when the button is pressed, the first switching terminal engages with the first input terminal and the second input terminal under an action of the button so that the first input terminal and the second input terminal are electrically connected, and the second switching terminal engages with the third input terminal and the fourth input terminal under an action of the button so that the third input terminal and the fourth input terminal are electrically connected.

As a further improvement of the present invention, the switching mechanism comprises a button partially positioned outside the housing, and a switching terminal or a plurality of switching terminals for engaging with the input terminal group, the button moves along the mating direction of the input port and the multi-voltage output interface or along an vertical direction.

As a further improvement of the present invention, the second input terminal is provided with a second contact terminal on an end thereof away from the single-voltage output interface or the multi-voltage output interface; the third input terminal is provided with a third contact terminal on an end thereof away from the single-voltage output interface or the multi-voltage output interface; the switching mechanism is provided with an abdicating groove; the second contact terminal elastically contacts with the third contact terminal by the abdicating groove and makes the second input terminal and the third input terminal be electrically connected.

As a further improvement of the present invention, the switching mechanism is also provided with a first abutting portion; when the first abutting portion is located between the second contact terminal and the third contact terminal, the second contact terminal elastically contacts with the first input terminal, and the third contact terminal elastically contacts with the fourth input terminal.

As a further improvement of the present invention, the switching mechanism is also provided with a second abutting portion; when the second abutting portion is located between the second contact terminal and the third contact terminal, the second contact terminal is electrically disconnected from the first input terminal and the third input terminal, and the third contact terminal is electrically disconnected from the second input terminal and the fourth input terminal.

As a further improvement of the present invention, the switching mechanism moves along a vertical direction or a mating direction of the input port and the single-voltage output interface.

As a further improvement of the present invention, the input port comprises a fixedly arranged input terminal group and a movably arranged input signal terminal; when the input port mates with the single-voltage output interface, the input terminal group is inserted into the single-voltage output interface, and the input signal terminal partially enters the adapter so that the input signal terminal is electrically disconnected from the single-voltage output interface; when the input port mates with the multi-voltage output interface, the input terminal group and the input signal terminal are inserted into the multi-voltage output interface.

As a further improvement of the present invention, the input terminal group comprises a first input terminal, a second input terminal, a third input terminal and a fourth input terminal which are arranged in sequence, and the input signal terminal is positioned between the second input terminal and the third input terminal; the output port comprises an output terminal group and an output signal terminal; the output terminal group comprises a first output terminal, a second output terminal, a third output terminal and a fourth output terminal which are arranged in sequence, and the output signal terminal is positioned between the second output terminal and the third output terminal; the first output terminal is connected to the first input terminal, the second output terminal is connected to the input signal terminal, the fourth output terminal is connected to the fourth input terminal, and the second input terminal is connected to the output signal terminal.

As a further improvement of the present invention, the input port further comprises an input signal terminal disposed on the base.

In order to achieve the above object, present invention also provide an power tool system, which comprises a single-voltage battery pack having a single-voltage output interface, a first power tool having a single-voltage input interface being coupleable with the single-voltage output interface of the single-voltage battery pack, a multi-voltage battery pack having a multi-voltage output interface, a second power tool having a multi-voltage input interface being coupleable with the multi-voltage output interface of the multi-voltage battery pack, the single-voltage output interface of the single-voltage battery pack being not coupleable to the multi-voltage input interface of the second power tool and the multi-voltage output interface of the multi-voltage battery pack being not coupleable to the single-voltage input interface of the first power tool, an adapter comprises an input port being coupleable with the single-voltage output interface of the single-voltage battery pack or the multi-voltage output interface of the multi-voltage battery pack, an output port electrically connected with the input port and being coupleable with the single-voltage input interface of the first power tool or the multi-voltage input interface of the second power tool, a switching mechanism being switchable between a first state and a second state, a housing for accommodating the input port, the output port and the switching mechanism, wherein when the input port is coupled with the single-voltage output interface of the single-voltage battery pack and the switching mechanism is in the first state, the second power tool can be coupled to the output port and powered by the single-voltage battery pack, when the input port is coupled with the multi-voltage output interface of the multi-voltage battery pack and the switching mechanism is in the second state, the first power tool can be coupled to the output port and powered by the multi-voltage battery pack.

The beneficial effect of the present invention is that: the adapter of the present invention can connect the multi-voltage output interface of the multi-voltage battery pack with the power tool having single-voltage input interface, or connect the single-voltage output interface of the single-voltage battery pack with the power tool having multi-voltage input interface. So that the power tool mating with single-voltage battery pack can be powered by the multi-voltage battery pack via the adapter, and the power tool mating with multi-voltage battery pack can be powered by the single-voltage battery pack via the adapter, thereby expanding the use range of the single-voltage battery pack and the multi-voltage battery pack.

DESCRIPTION OF EMBODIMENT

In order to make the objectives, technical solutions, and advantages of the present invention clearer, the following describes the present invention in detail with reference to accompanying drawings and specific embodiment.

Figure 1:
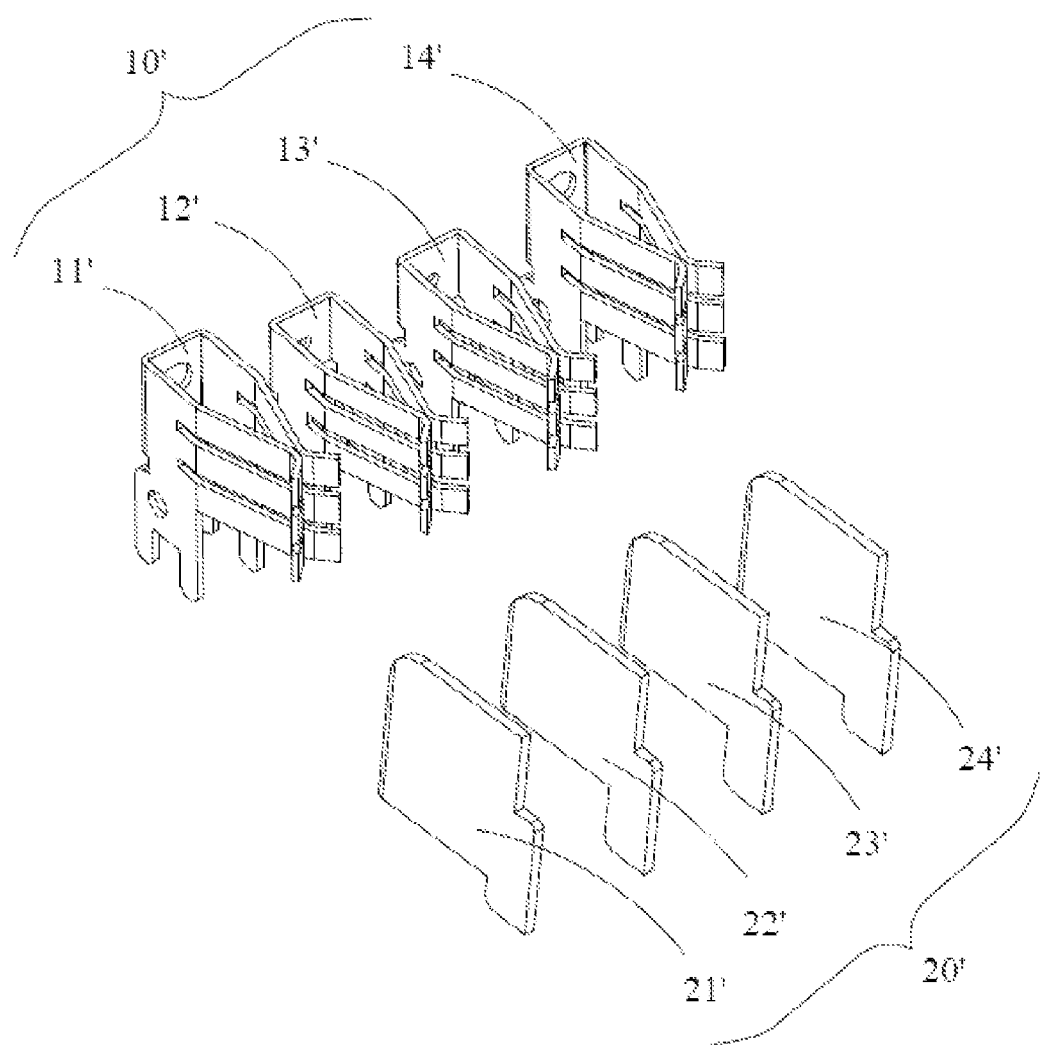
FIG. 1 is a view showing a single-voltage output interface of a single-voltage battery pack and a single-voltage input interface of a power tool.

FIG. 1 is a view of a single-voltage output interface 10' provided on a single-voltage battery pack and a single-voltage input interface 20' provided on a power tool that is mated with the single-voltage battery pack. The single-voltage output interface 10' includes a first output terminal 11', a second output terminal 12', a third output terminal 13', and a fourth output terminal 14'. The single-voltage input interface 20' includes a first input terminal 21', a second input terminal 22', a third input terminal 23', and a fourth input terminal 24'. Wherein the first output terminal 11' is a positive terminal, the second output terminal 12' is a signal terminal, the third output terminal 13 'is a charging terminal, and the fourth output terminal 14' is a negative terminal; the first input terminal 21' is a positive terminal, the second input terminal 22' is a signal terminal, the third input terminal 23' is a securing terminal (the third input terminal 23' can be omitted in some embodiments, if the single-voltage input interface 20' is mounted on a charger, the third input terminal 23' is a charging terminal), and the fourth input terminal 24' is a negative terminal. When the single-voltage battery pack couples with the power tool, the single-voltage output interface 10' and the single-voltage input interface 20' engages with each other. The first output terminal 11' connects with the first input terminal 21', the second output terminal 12' connects with the second input terminal 22', the third output terminal 13' connects with the third input terminal 23' (there is no power delivered therebetween), the fourth output terminal 14' connects with the fourth input terminal 24'.

Figure 2:
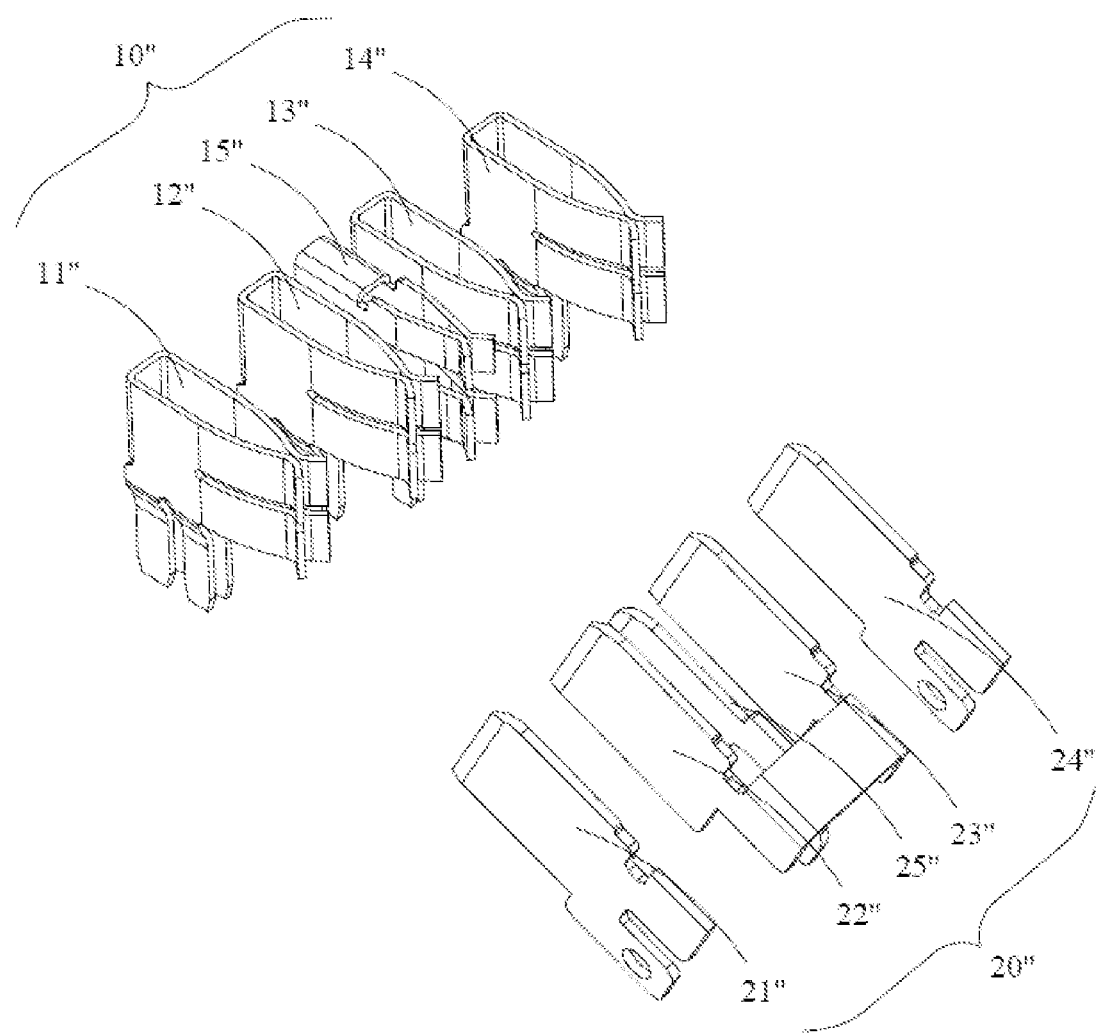
FIG. 2 is a view showing a multi-voltage output interface of a multi-voltage battery pack and a first multi-voltage input interface of a power tool.

FIG. 2 is a view of a multi-voltage output interface 10" disposed on a multi-voltage battery pack and a multi-voltage input interface 20" disposed on a power tool. It should be noted that the multi-voltage output interface 10" described herein has at least two coupling states so that the multi-voltage battery pack outputs at least two different voltages in different coupling states. The multi-voltage input interface 20" is an interface matched with the multi-voltage output interface so as to obtain the power output by the multi-voltage output interface 10". Taking a dual-voltage battery pack as an example, the dual-voltage battery pack comprises two sets of battery cells (a first set of battery cells comprising a plurality of battery cells connected in series and a second set of battery cells comprising a plurality of battery cells connected in series), every set of battery cells has a positive electrode and a negative electrode. The multi-voltage output interface 10" includes a first output terminal 11" (first positive terminal) connected with the positive electrode of the first set of battery cells, a second output terminal 12" (second positive terminal) connected with the positive electrode of the second set of battery cells, an output signal terminal 15", a third output terminal 13" (first negative terminal) connected with the negative electrode of the first set of battery cells, and a fourth output terminal 14" (second negative terminal) connected with the negative electrode of the second set of battery cells, which are sequentially provided. The multi-voltage input interface 20" comprises a first input terminal 21" (positive), a second input terminal 22" (positive), an input signal terminal 25", a third input terminal 23" (negative) and a fourth input terminal 24" (negative). The second input terminal 22" and the third input terminal 23" are electrically connected. When the dual-voltage battery pack couples with the power tool, the multi-voltage interface 10" engages with the multi-voltage input interface 20", the first output terminal 11" connects with the first input terminal 21", the second output terminal 12" connects with the second input terminal 22", the third output terminal 13" connects with the third input terminal 23", the fourth output terminal 14" connects with the fourth input terminal 24", the output signal terminal 15" connects with the input signal terminal 25" to transmit signal. In this configuration, the first set of battery cells and the second set of battery cells are series connected. So that the multi-voltage input interface 20" of the power tool can obtains a series voltage output by the multi-voltage output interface 10".

Figure 3:
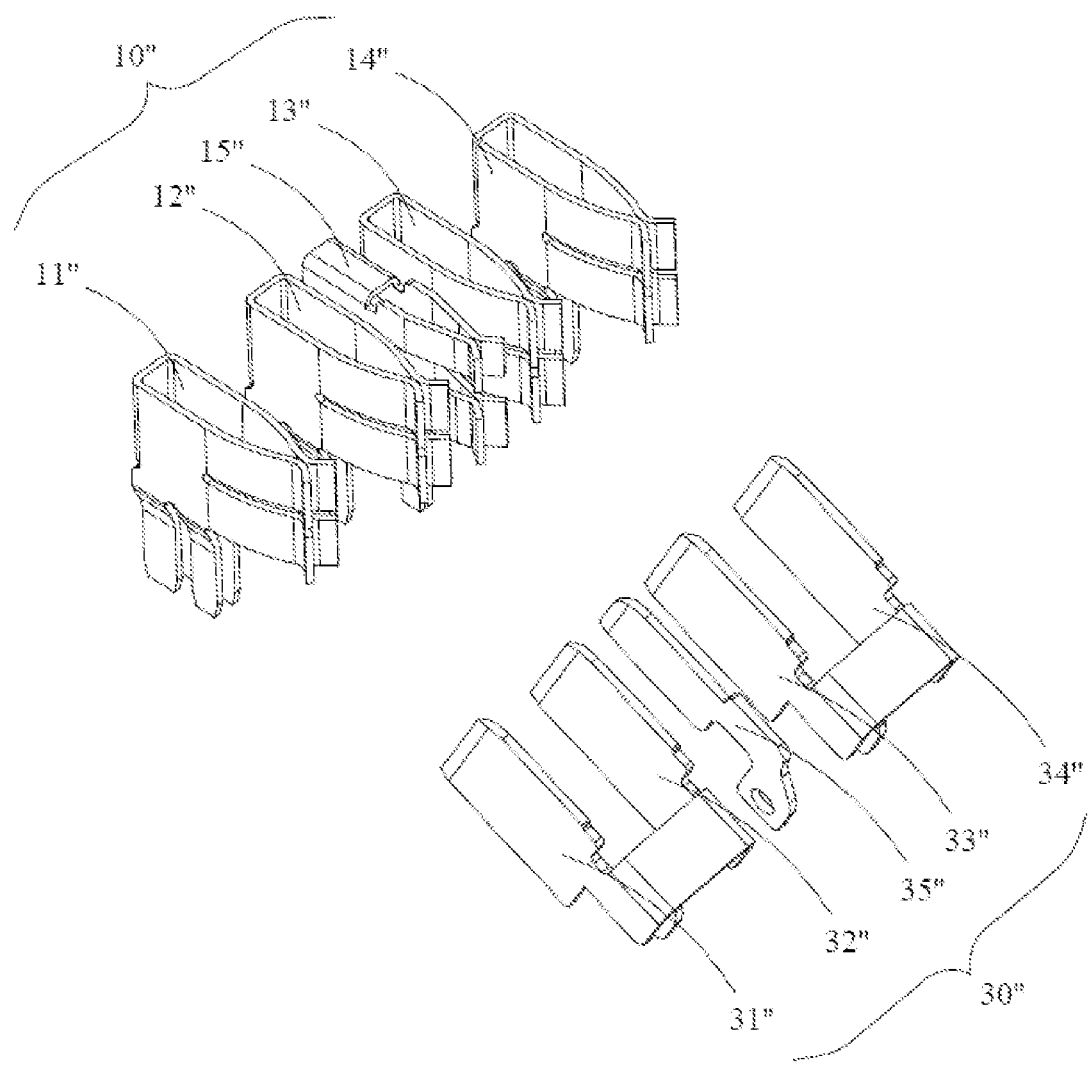
FIG. 3 is a view showing the multi-voltage output interface of a multi-voltage battery pack and a second multi-voltage input interface of a power tool.

FIG. 3 is a view of the multi-voltage output interface 10" disposed on the multi-voltage battery pack and another multi-voltage input interface 30" disposed on another power tool. The multi-voltage input interface 30" comprises a first input terminal 31" (positive), a second input terminal 32"

(positive), an input signal terminal 35", a third input terminal 33" (negative) and a fourth input terminal 34" (negative). The first input terminal 31" and the second input terminal 32" are electrically connected, and the third input terminal 33" and the fourth input terminal 34" are electrically connected, When the dual-voltage battery pack couples with the power tool, the multi-voltage interface 10" engages with the multi-voltage input interface 30", the first output terminal 11" connects with the first input terminal 31", the second output terminal 12" connects with the second input terminal 32", the third output terminal 13" connects with the third input terminal 33", the fourth output terminal 14" connects with the fourth input terminal 34", the output signal terminal 15" connects with the input signal terminal 35" to transmit signal. In this configuration, the first set of battery cells and the second set of battery cells are parallel connected so that the multi-voltage input interface 30" can obtain a parallel voltage output by the multi-voltage output interface 10".

Due to the difference in structure, the single-voltage battery pack is uncoupleable with the power tools that is matching with the multi-voltage battery pack, similar, the multi-voltage battery pack is also not matched with the power tool that is matching with the single-voltage battery pack. Therefore, the application ranges of the single-voltage battery pack and the multi-voltage battery pack are limited, and resource waste is caused.

Figure 4:
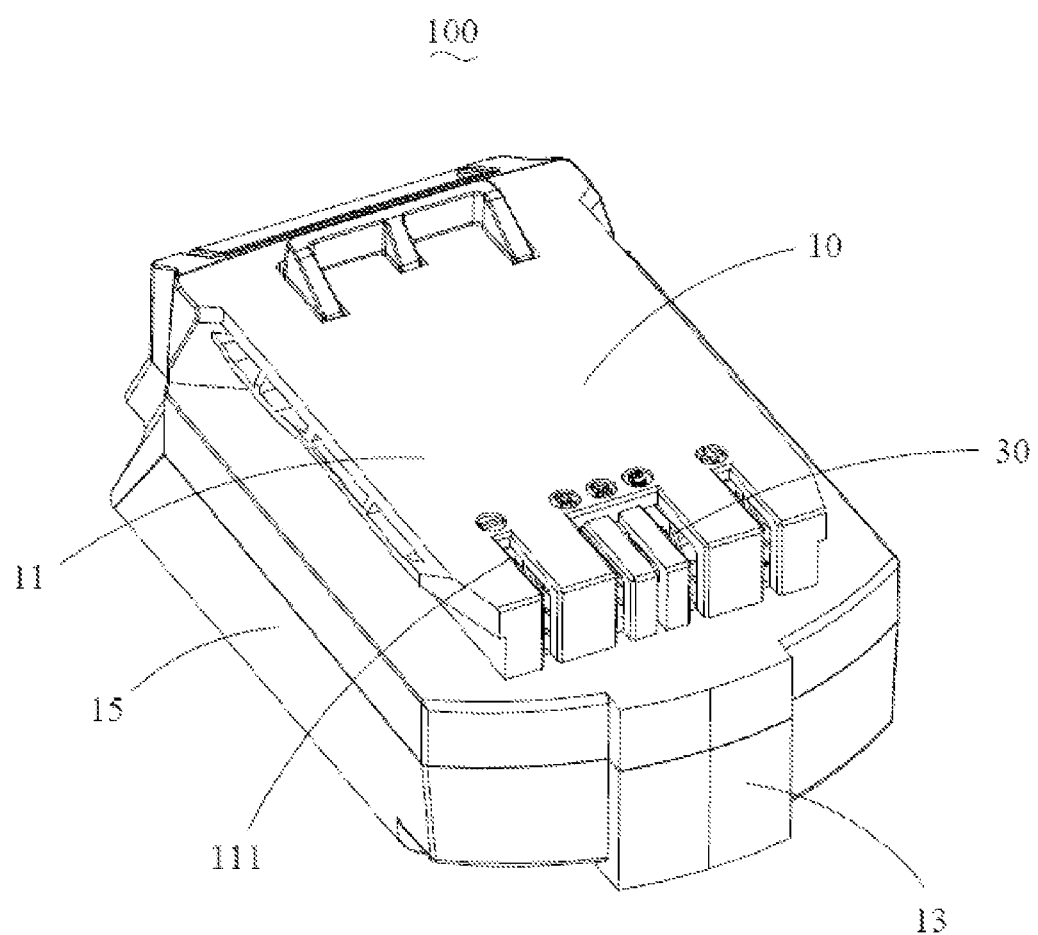
FIG. 4 is a perspective view of an adapter according to a first embodiment of the present invention.
Figure 5:
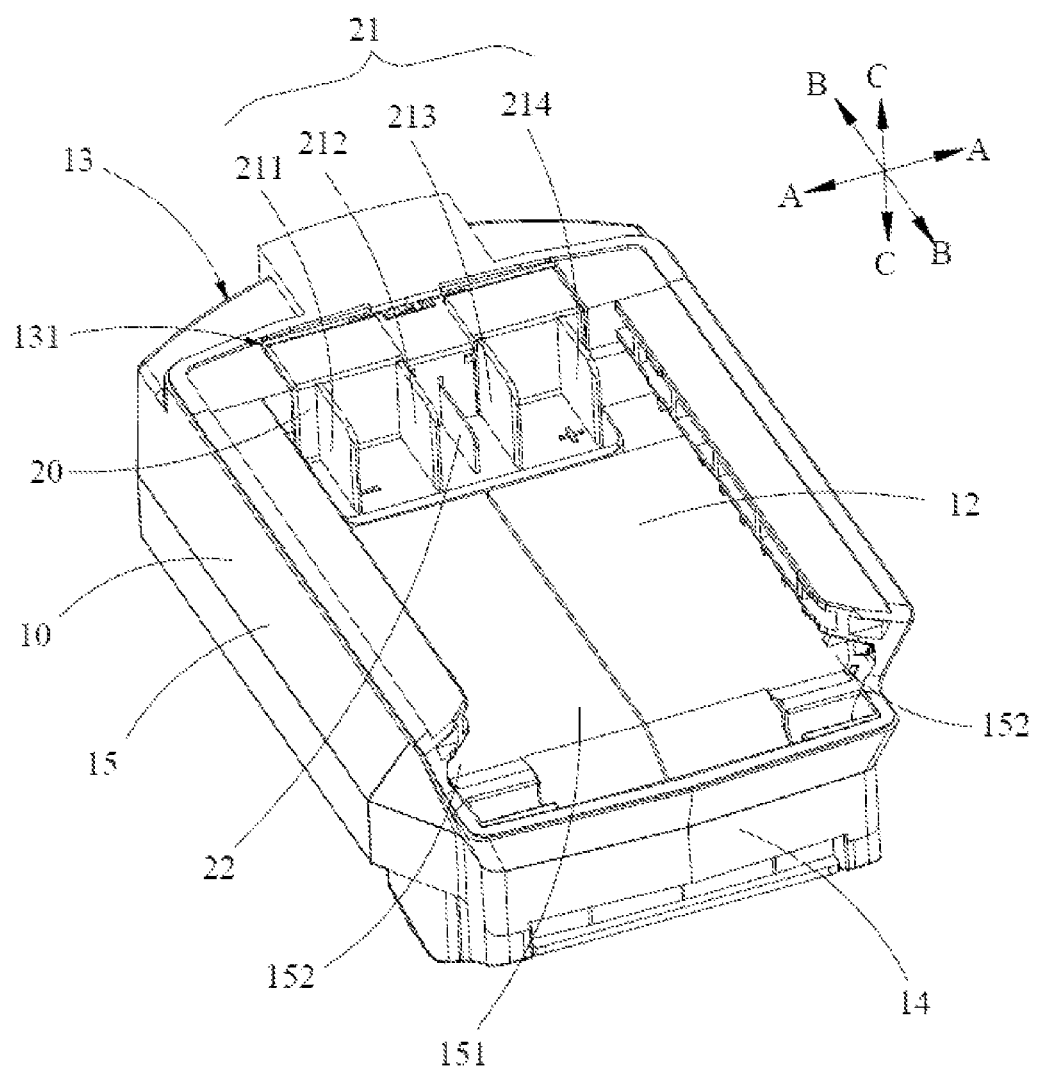
FIG. 5 is another perspective view showing the bottom of the adapter in FIG. 4.
Figure 6:
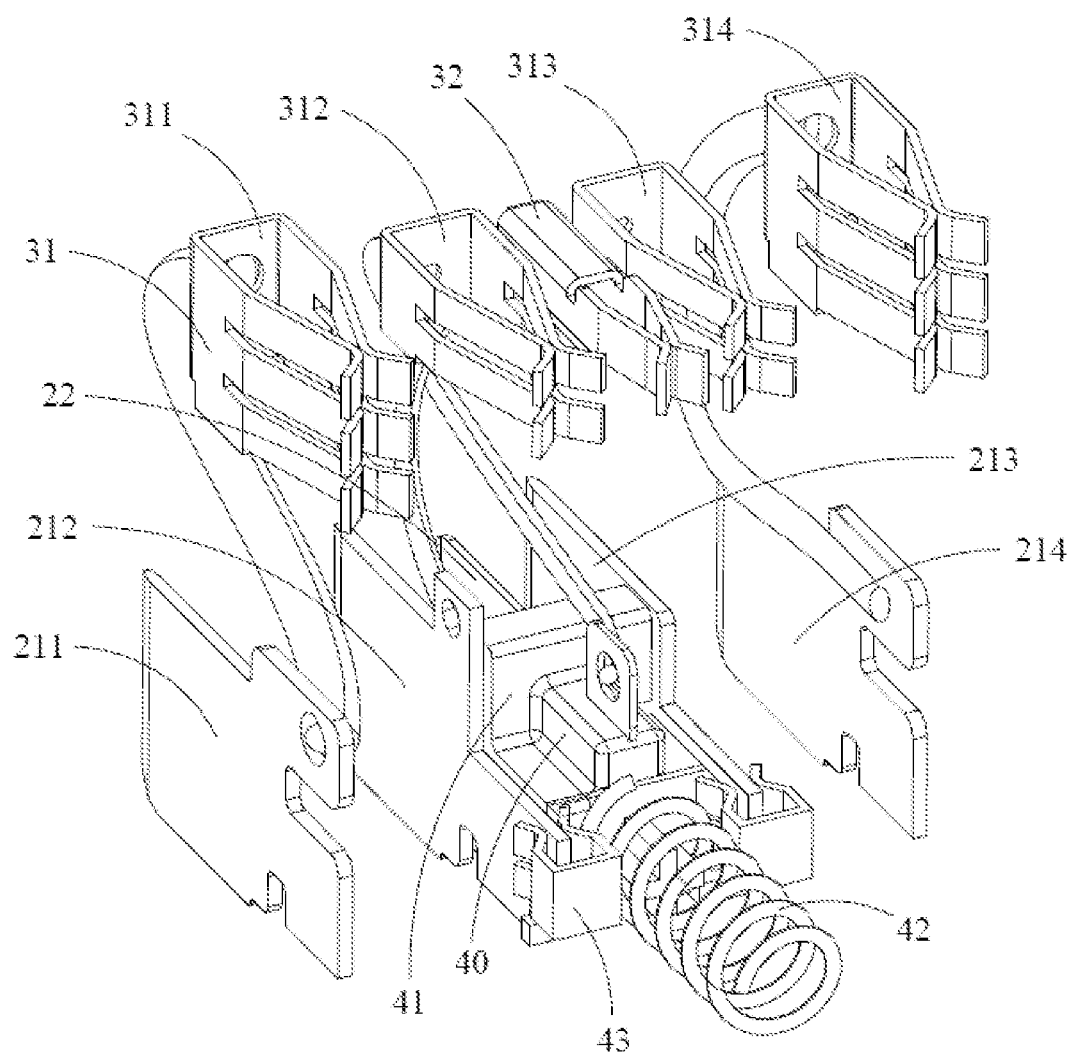
FIG. 6 is a view showing an internal structure of the adapter shown in FIG. 4.

The invention provides an adapter 100 to solve the problems discussed above. Referring to FIG. 4, FIG. 5 and FIG. 6, the adapter 100 has a housing 10, and an input port 20, an output port 30 connected with the input port 20 and a first switching mechanism 40 mounted on the housing 10.

Referring to FIGS. 4-6, the housing 10 is provided with a top wall 11, a bottom wall 12 opposite to the top wall 11, a front wall 13 near the input port 20 and the output port 30, a rear wall 14 opposite to the front wall 13, and two side walls 15 on both sides of the top wall 11. The top wall 11, the bottom wall 12, the front wall 13, the rear wall 14 and the side wall 15 together define a receiving cavity (not shown) for receiving the input port 20, the output port 30 and the first switching mechanism 40. An output terminal groove 111 communicated with the receiving cavity is arranged at one end of the top wall 11 close to the front wall 13. An input terminal groove 131 communicated with the receiving cavity is arranged between the front wall 13 and the bottom wall 12. The bottom wall 12 and the side wall 15 together form an inserting slot 151 for sliding insertion of a single-voltage output interface disposed on a single-voltage battery pack or a multi-voltage output interface disposed on a multi-voltage battery pack. A sliding rail 152 is formed on a side of the sidewall 15 facing the inserting slot 151 to guide the sliding insertion of the single-voltage battery pack or the multi-voltage battery pack. In this embodiment, the sliding rail 152 is a groove. However, it is understood that the sliding rail 152 may also be a protrusion, and the present invention is not limited to the specific structure of the sliding rail 152.

Referring to FIG. 4, FIG. 5 and FIG. 6, the input port 20 is used to couple with the single-voltage output interface disposed on the single-voltage battery pack or the multi-voltage output interface disposed on the multi-voltage battery pack to obtain an output voltage of the single-voltage battery pack or the multi-voltage battery pack. The input port 20 has an input terminal group 21 fixedly installed in the input terminal groove 131 and an input signal terminal 22 movably installed. The input terminal group 21 includes a first input terminal 211, a second input terminal 212, a third input terminal 213, and a fourth input terminal 214, which are sequentially disposed.

The input signal terminal 22 is located between the second input terminal 212 and the third input terminal 213. The input signal terminals 22 are arranged by such way: when the input port 20 is coupled with the single-voltage output interface of the single-voltage battery pack, the input signal terminal 22 at least partially enters the adapter 100 so that the input signal terminal 22 is electrically disconnected from the single-voltage output interface, and the input terminal group 21 is inserted into the single-voltage output interface; when the input port 20 is coupled with the multi-voltage output interface of the multi-voltage battery pack, the input terminal group 21 and the input signal terminal 22 are inserted into the multi-voltage output interface. The output port 30 is electrically connected to the input port 20 which is coupled to an input interface provided on a power tool so as to output a voltage to the power tool.

The output port 30 has an output terminal group 31 mounted in the output terminal groove 111 and an output signal terminal 32. The output terminal group 31 is provided with a first output terminal 311, a second output terminal 312, a third output terminal 313 and a fourth output terminal 314, which are sequentially arranged. The output signal terminal 32 is located between the second output terminal 312 and the third output terminal 313. The first input terminal 211 is electrically connected to the first output terminal 311, the second input terminal 212 is electrically connected to the output signal terminal 32, the fourth input terminal 214 is electrically connected to the fourth output terminal 314, and the input signal terminal 22 is electrically connected to the second output terminal 312.

Referring to FIG. 5 and FIG. 6, the first switching mechanism 40 has a base 41, an elastic element 42, and a connecting terminal 43. The input signal terminal 22 is mounted on the base 41; one end of the elastic element 42 is mounted on the base 41, and the other end of the elastic element 42 is mounted on the housing 10; the connecting terminal 43 is mounted on the base 41, the connecting terminal 43 has two ends electrically connected, in the normal state, the connecting terminal 43 electrically connects the second input terminal 212 and the third input terminal 213.

When the input port 20 is connected to the single-voltage output interface 10' disposed on the single-voltage battery pack, and the output port 30 is connected to a multi-voltage input interface disposed on a power tool, the input signal terminal 22 is abutted against by the single-voltage battery pack and moves along a mating direction of the input port 20 and the single-voltage output interface. The input signal terminal 22 at least partially enters into the housing 10, so that the base 41 moves with the input signal terminal 22, at this time, the elastic element 42 is elastically deformed, the connecting terminal 43 is electrically disconnected from the second input terminal 212 and the third input terminal 213, and the input terminal group 21 of the adapter 100 is inserted into the single-voltage output interface 10' of the single-voltage battery pack to obtain the output voltage of the single-voltage battery pack. At this time, the first input terminal 211 connects with the first output terminal 11', the second input terminal 212 connects with the second output terminal 12' (signal terminal), the input signal terminal 22 connects with no terminals, the third input terminal 213 connects with the third output terminal 13' but there is no power transmitted therebetween, the fourth input terminal 214 connects with the fourth output terminal 14'. In this state, the input signal terminal 22 does not work, and the first switching mechanism 40 is in a first state; the second input terminal 212 serves as a signal terminal and communicates with the power tool via the output signal terminal 32; the first input terminal 211 and the fourth input terminal 214 transmit power of the single-voltage battery pack to the power tool having multi-voltage input interface 30" by the first output terminal 311 and the fourth output terminal 314.

When the input port 20 is connected to the multi-voltage output interface 10" provided on the multi-voltage battery pack and the output port 30 is connected to a single-voltage input interface 20' provided on a power tool, the first switching mechanism 40 is in a second state. At this time, the connecting terminal 43 is electrically connected to the second input terminal 212 and the third input terminal 213. In this configuration, the first input terminal 211 connects with the first output terminal 11", the second input terminal 212 connects with the second output terminal 12", the input signal terminal 22 connects with the output signal terminal 15", the third input terminal connects with the third output terminal 13", the fourth output terminal 214 connects with the fourth output terminal 14". The input signal terminal 22 works and communicates with the power tool having single-voltage input interface 20' by the second output terminal 312. As the second input terminal 212 and the third input terminal 213 are electrically connected by the connecting terminal 43, the sets of the battery cells accommodated in the multi-voltage battery pack are series connected. Furthermore, the first input terminal 21' of the single-voltage input interface 20' connects with the first output terminal 311 of the adapter 100, the second input terminal 22' (signal terminal) connects with the second output terminal 312, the third input terminal 23' (securing terminal) connects with the third output terminal 313, the fourth input terminal 24' connects with the fourth output terminal 314. The first input terminal 211 and the fourth input terminal 214 transmit the first voltage to the power tool having the single-voltage input interface 20' by the first output terminal 311 and the fourth output terminal 314. In this embodiment, the multi-voltage battery pack is a dual-voltage battery pack, the first voltage is a series voltage output by the dual-voltage battery pack.

In the present embodiment, the connecting terminal 43 is used to electrically connect the second input terminal 212 and the third input terminal 213. However, it is understood that, in other embodiments, the connecting terminals 43 may further include a first connecting terminal (not shown) and a second connecting terminal (not shown). The first connecting terminal and the second connecting terminal are configured to: when the elastic element 42 is elastically deformed, the first connecting terminal is electrically disconnected from the first input terminal 211 and the second input terminal 212, the second connecting terminal is electrically disconnected from the third input terminal 213 and the fourth input terminal 214, at that time the first switching mechanism 40 is in the first state; when the elastic element 42 resets, the first connecting terminal is electrically connected to the first input terminal 211 and the second input terminal 212, and the second connecting terminal is electrically connected to the third input terminal 213 and the fourth input terminal 214, so that the input port 20 obtains a second voltage output by the multi-voltage battery pack, and at this time, the first switching mechanism 40 is in the second state. In this embodiment, the multi-voltage battery pack is a dual-voltage battery pack, the second voltage is a parallel voltage output by the dual-voltage battery pack.

In the present embodiment, when the elastic element 42 is elastically deformed, the base 41 is configured to move along the mating direction of the input port 20 and the single-voltage output interface of the single voltage battery pack (i.e., direction BB in FIG. 5). However, it is understood that in other embodiments, the base 41 may be configured to move in a vertical direction (i.e., direction CC in FIG. 5). When the input port 20 is connected to the single-voltage output interface of the single voltage battery pack, the base 41 is vertically retracted into the adapter 100 under the action of the single-voltage battery pack.

Figure 7:
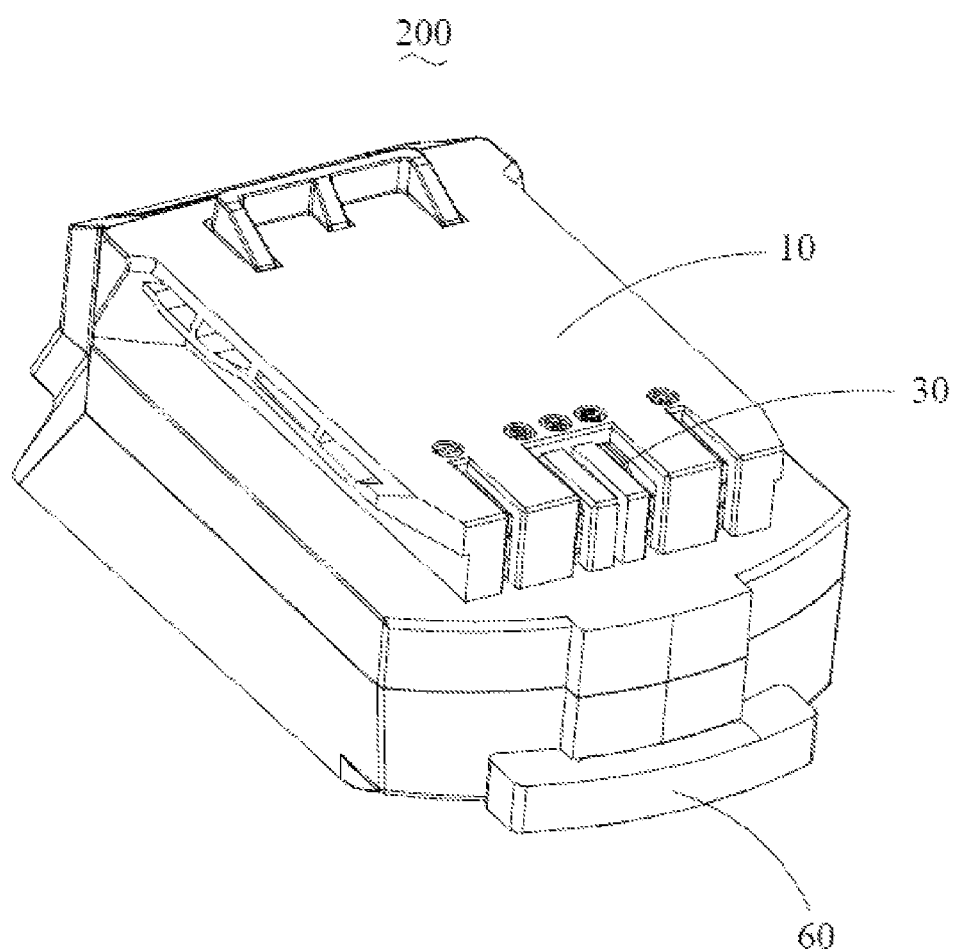
FIG. 7 is a perspective view of another adapter according to a second embodiment of the present invention.
Figure 8:
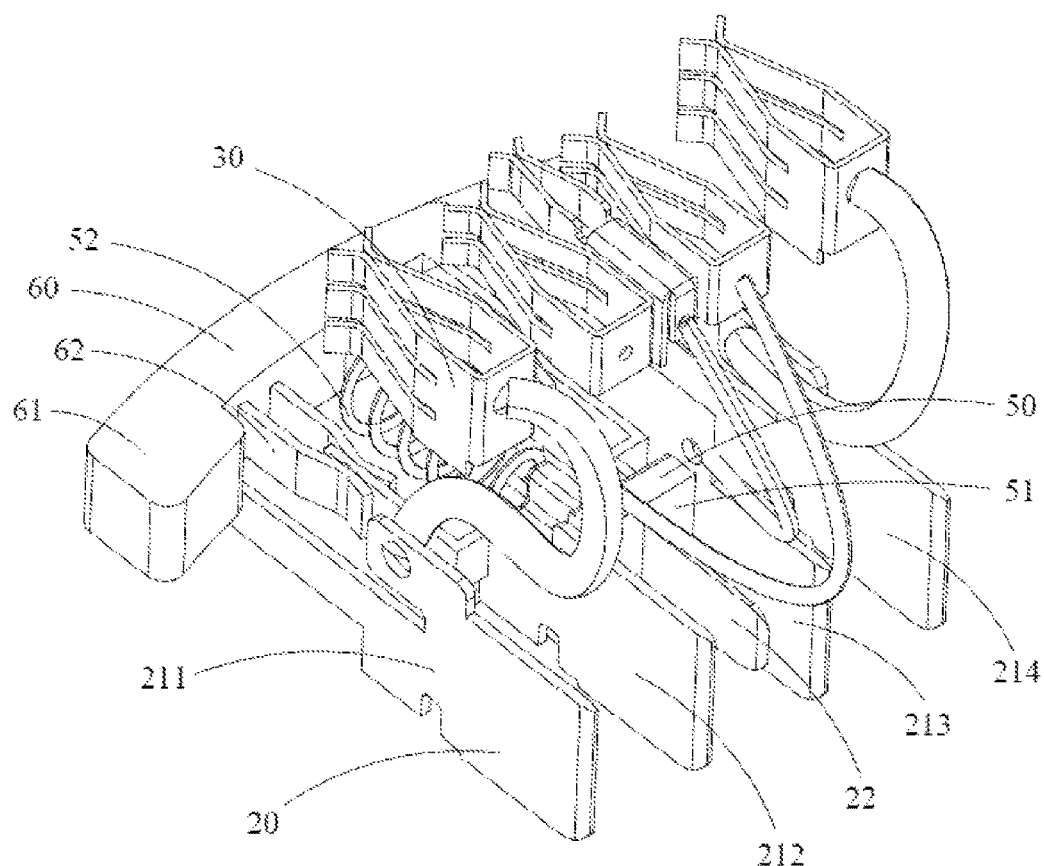
FIG. 8 is a view showing an internal structure of the adapter shown in FIG. 7.

FIG. 7 shows an adapter 200 according to a second embodiment of the invention. Referring to FIG. 7 and FIG. 8, the adapter 200 has a similar structure as the adapter 100, and includes a housing 10, an input port 20, an output port 30, an abdicating mechanism 50 and a second switching mechanism 60. Wherein the housing 10, the input port 20, the output port 30 still use the numerals for the same structures in the adapter 100. The abdicating mechanism 50 comprises a base body 51 and an elastic member 52 engaged with the base body 51. The input signal terminal 22 is mounted on the base body 51. The elastic member 52 has one end mounted on the base body 51 and the other end mounted on the housing 10. When the input port 20 is coupled with the single-voltage output interface 10' arranged on the single-voltage battery pack, the input signal terminal 22 at least partially enters the housing 10 under the butting of the single-voltage battery pack, so that the input signal terminal 22 is electrically disconnected from the single-voltage output interface; at this time, the base body 51 moves under the action of the input signal terminal 22 or the single-voltage battery pack, and elastically deforms the elastic member 52.

The second switching mechanism 60 includes a button 61 partially located outside the housing 10 and a switching terminal 62 mounted on the button 61 and engaged with the input terminal group 21. The switching terminal 62 comprises a first switching terminal (not shown) and a second switch terminal (not shown), the first switching terminal and the second switching terminal are electrically connected with each other. When the input port 20 is coupled to the multi-voltage output interface 10" disposed on the multi-voltage battery pack, and the button 61 is pressed on, the first switching terminal of the switching terminal 62 connects the second input terminal 212 and the second switching terminal of the switching terminal 62 connects the third input terminal 213 under the action of the button 61, so that the second input terminal 212 and the third input terminal 213 are electrically connected, the input port 20 obtains a first voltage output by the multi-voltage battery pack, and the second switching mechanism 60 is in a second state. In this embodiment, the multi-voltage battery pack is a dual-voltage battery pack, the first voltage is a series voltage output by the dual-voltage battery pack.

Figure 9:
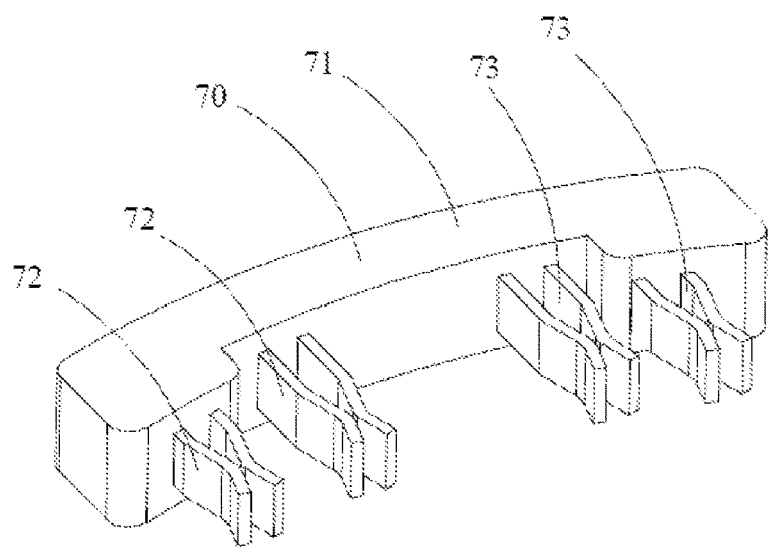
FIG. 9 is an alternative embodiment of the second switching mechanism.

FIG. 9 shows an alternative embodiment of the second switching mechanism 60 of the second embodiment of the adapter 200. A second switching mechanism 70 includes a button 71, and a first switching terminal 72 and a second switching terminal 73 mounted on the button 71. The first switching terminal 72 has two terminals electrically connected, the second switching terminal 73 has two terminals electrically connected. When the input port 20 is connected to the multi-voltage output interface 10" disposed on the multi-voltage battery pack and the button 71 is pressed on, the first switching terminal 72 connects the first input terminal 211 and the second input terminal 212 so that the first input terminal 211 and the second input terminal 212 are electrically connected, the second switching terminal 73 connects the third input terminal 213 and the fourth input terminal 214 so that the third input terminal 213 and the fourth input terminal 214 are electrically connected, so that the input port 20 obtains a second voltage output by the multi-voltage battery pack, and the second switching mechanism 70 is in a second state. In this embodiment, the multi-voltage battery pack is a dual-voltage battery pack, the second voltage is a parallel voltage output by the dual-voltage battery pack. The single-voltage input interface 20' of the power tool couples with the output port 30 and is powered by the power output from the dual-voltage battery pack.

In the foregoing embodiments, the buttons 61, 71 of the switching mechanisms 60, 70 both drive the switching terminal 62 or the first switching terminal 72 and the second switching terminal 73 move along the mating direction of the input port 20 and the multi-voltage output interface 10" of the multi-voltage battery pack. However, it is understood that in other embodiments, the buttons 61, 71 may be arranged to drive the switch terminal 62 or the first switching terminal 72 and the second switching terminal 73 in a vertical direction (i.e., direction CC in FIG. 5).

Figure 10:
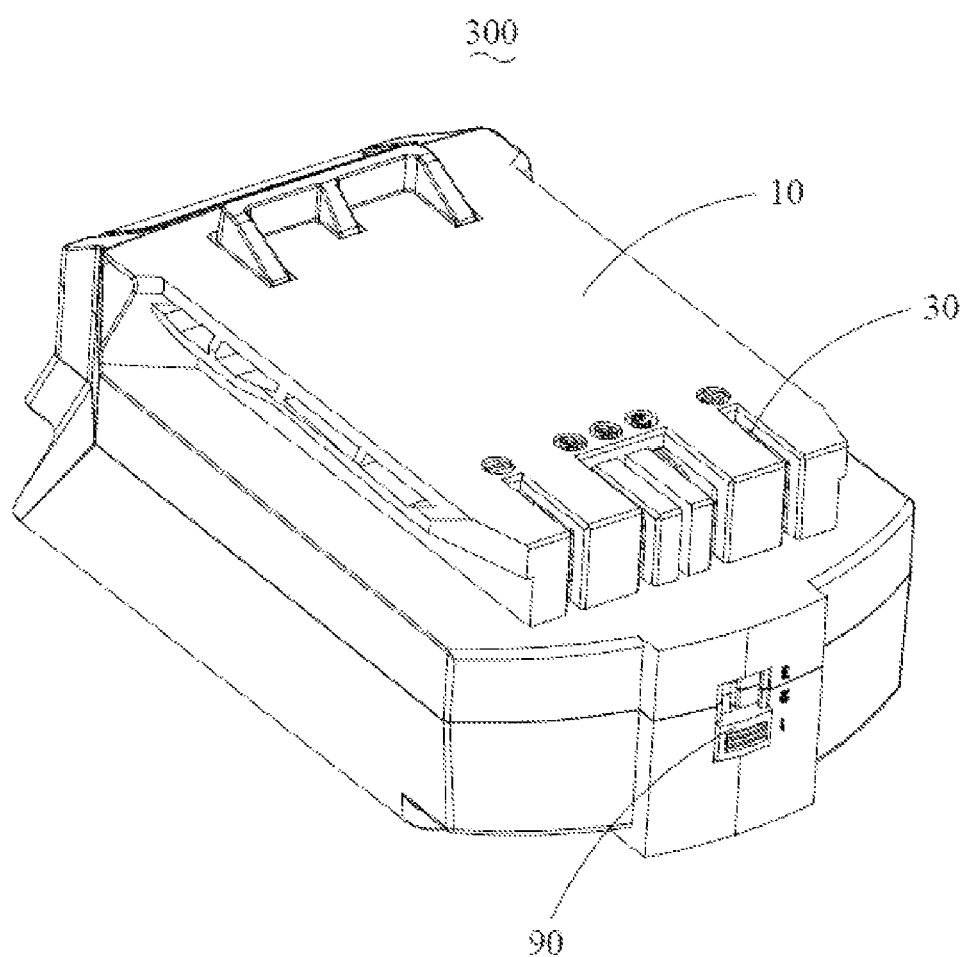
FIG. 10 is a perspective view of an adapter according to a third embodiment of the present invention.
Figure 11:
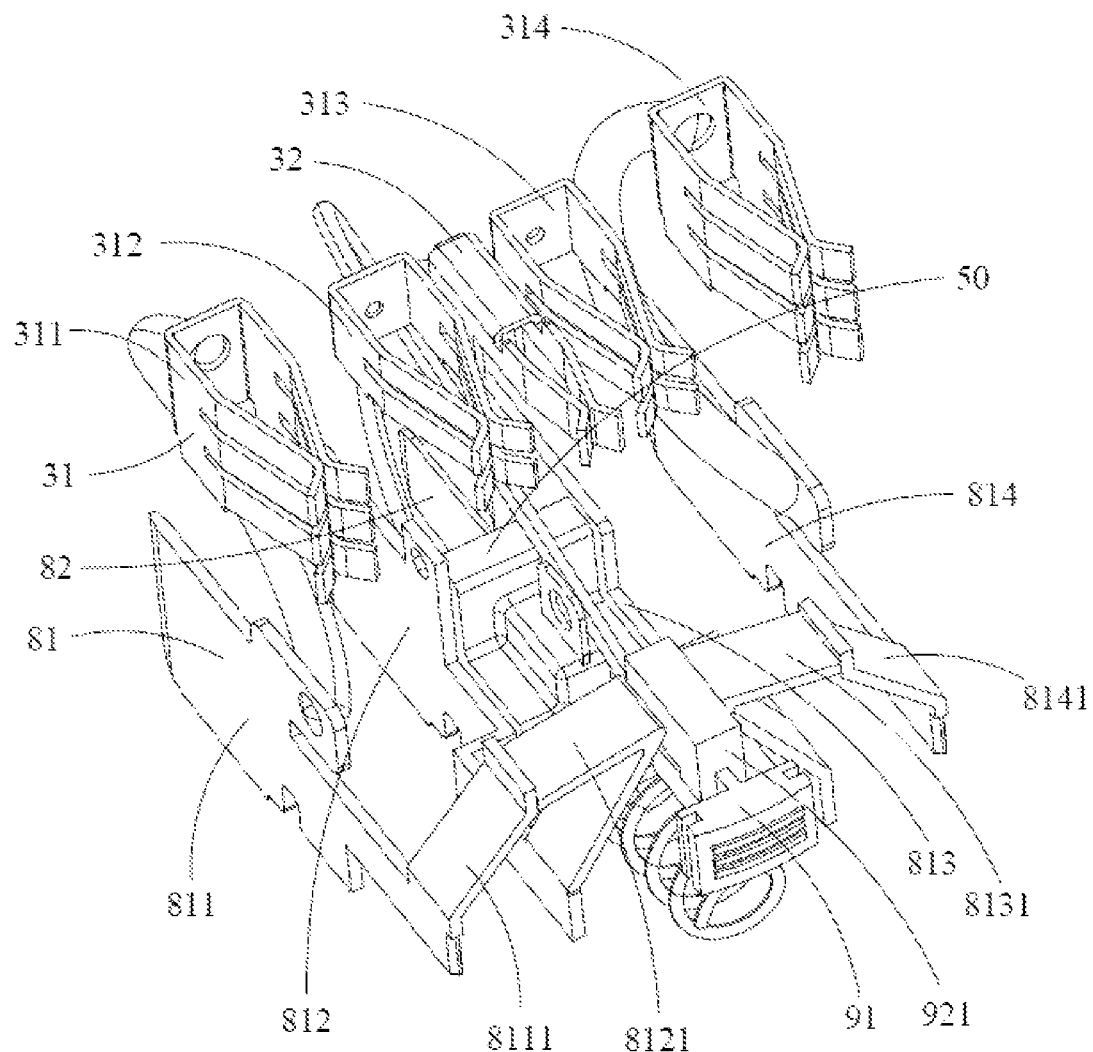
FIG. 11 is a view showing a first abutting portion of the adapter shown in FIG. 10 located between the second contact terminal and the third contact terminal.

FIG. 10 shows an adapter 300 according to a third embodiment of the invention. Referring to FIG. 10 and FIG. 11, the adapter 300 includes a housing 10, an input port 80, an output port 30, an abdicating mechanism 50, and a third switching mechanism 90. Wherein the housing 10, the output port 30 and the abdicating mechanism 50 still use the numerals for the same structures in the adapter 200. The input port 80 includes an input terminal group 81 and an input signal terminal 82. The input terminal group 81 includes a first input terminal 811, a second input terminal 812, a third input terminal 813, and a fourth input terminal 814, which are arranged in this order, and the input signal terminal 82 is located between the second input terminal 812 and the third input terminal 813. The first input terminal 811 is electrically connected to the first output terminal 311, the second input terminal 812 is electrically connected to the output signal terminal 32, the fourth input terminal 814 is electrically connected to the fourth output terminal 314, and the second output terminal 312 is electrically connected to the input signal terminal 82.

The first input terminal 811 is provided with a first contact terminal 8111 at an end thereof away from the single-voltage output interface 10' or the multi-voltage output interface 10", the second input terminal 812 is provided with a second contact terminal 8121 at an end thereof away from the single-voltage output interface 10' or the multi-voltage output interface 10", the third input terminal 813 is provided with a third contact terminal 8131 at an end thereof away from the single-voltage output interface 10' or the multi-voltage output interface 10", and the fourth input terminal 814 is provided with a fourth contact terminal 8141 at an end thereof away from the single-voltage output interface 10' or the multi-voltage output interface 10".

Figure 14:
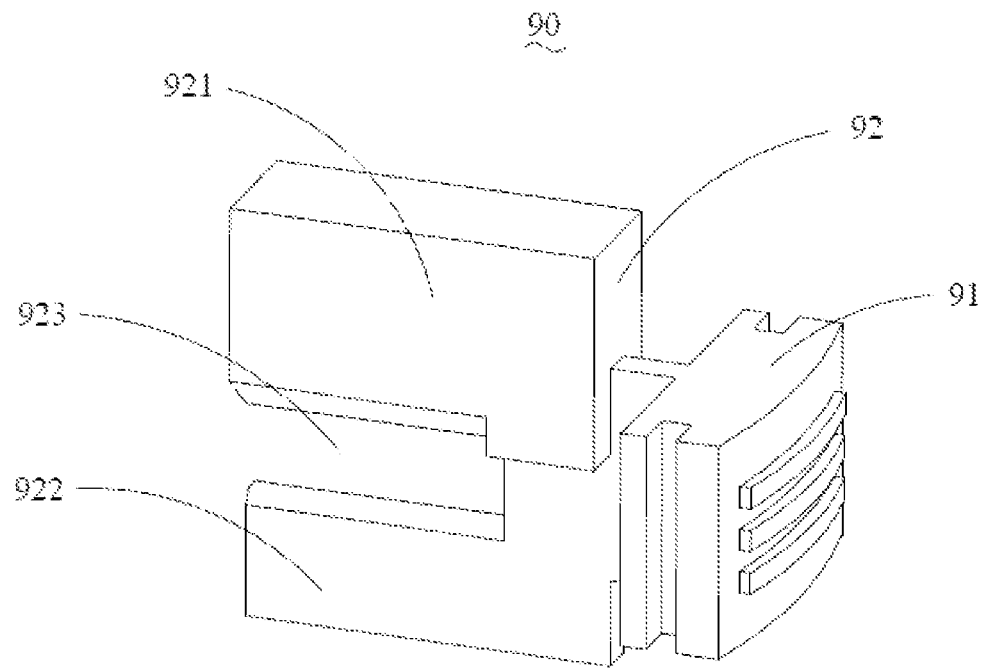
FIG. 14 is a perspective view of a third switching mechanism.

Referring to FIG. 11 and FIG. 14, the third switching mechanism 90 includes an operating portion 91 located outside the housing 10 and an abutting portion 92 located inside the housing 10. The abutting portion 92 includes a first abutting portion 921, a second abutting portion 922, and an abdicating groove 923 located between the first abutting portion 921 and the second abutting portion 922, a thickness of the first abutting portion 921 is greater than that of the second abutting portion 922. When the operating portion 91 is pushed so that the first abutting portion 921 is located between the second contact terminal 8121 and the third contact terminal 8131, the third switching mechanism 90 is in a second state, the second contact terminal 8121 elastically contacts with the first contact terminal 8111 under the action of the first abutting portion 921, and the third contact terminal 8131 elastically contacts with the fourth contact terminal 8141 under the action of the first abutting portion 921. The battery sets of the multi-voltage battery pack are paralleled connected. So that the input port 80 obtains a second voltage output by the multi-voltage battery pack and outputs to the output port 30 of the adapter 300.

Figure 12:
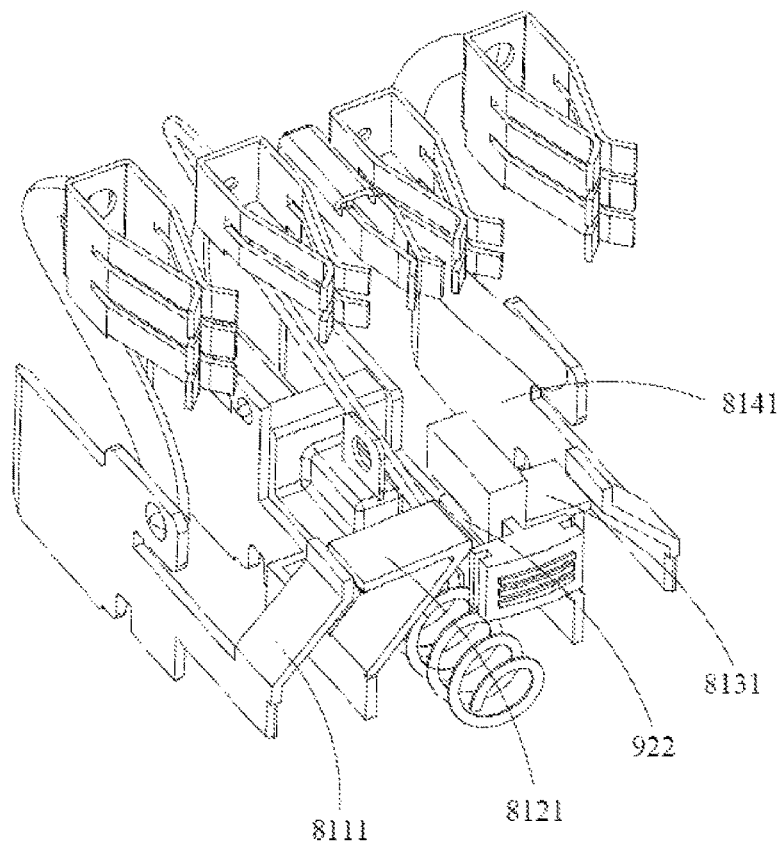
FIG. 12 is a view showing a second abutting portion of the adapter shown in FIG. 10 disposed between the second contact terminal and the third contact terminal.

In this embodiment, the multi-voltage battery pack is a dual-voltage battery pack, the second voltage is a parallel voltage output by the dual-voltage battery pack, at that time, the first input terminal 811 and the second input terminal 812 are electrically connected, and the third input terminal 813 and the fourth input terminal 814 are electrically connected. Referring to FIG. 12, when the operating portion 91 is pushed so that the second abutting portion 922 is located between the second contact terminal 8121 and the third contact terminal 8131, the third switching mechanism 90 is in a first state, the second contact terminal 8121 is electrically disconnected from the first contact terminal 8111 and the third contact terminal 8131 is electrically disconnected from the second contact terminal 8141; in this case, the input port 90 may be connected to the single voltage output port 10' provided on the single voltage battery pack.

Figure 13:
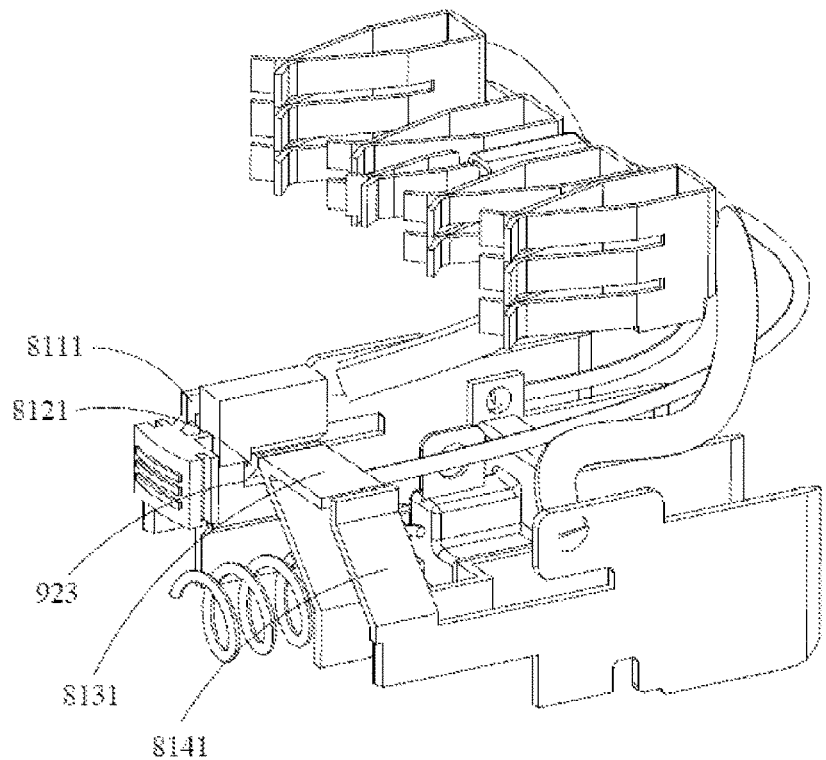
FIG. 13 is a view showing an abdicating groove of the adapter shown in FIG. 10 disposed between the second contact terminal and the third contact terminal.

Referring to FIG. 13, when the operation portion 91 is pushed so that the abdicating groove 923 is located between the second contact terminal 8121 and the third contact terminal 8131, the third switching mechanism 90 is in a second state, and the second contact terminal 8121 and the third contact terminal 8131 elastically abut against each other through the abdicating groove 923, so that the input port 80 obtains a first voltage output by the multi-voltage battery pack. In this embodiment, the second state has two cases, one outputs the first voltage and the other outputs the second voltage. In this embodiment, the multi-voltage battery pack is a dual-voltage battery pack, the first voltage is a series voltage output by the dual-voltage battery pack, and in this case, the second input terminal 812 and the third input terminal 813 are electrically connected.

Figure 15:
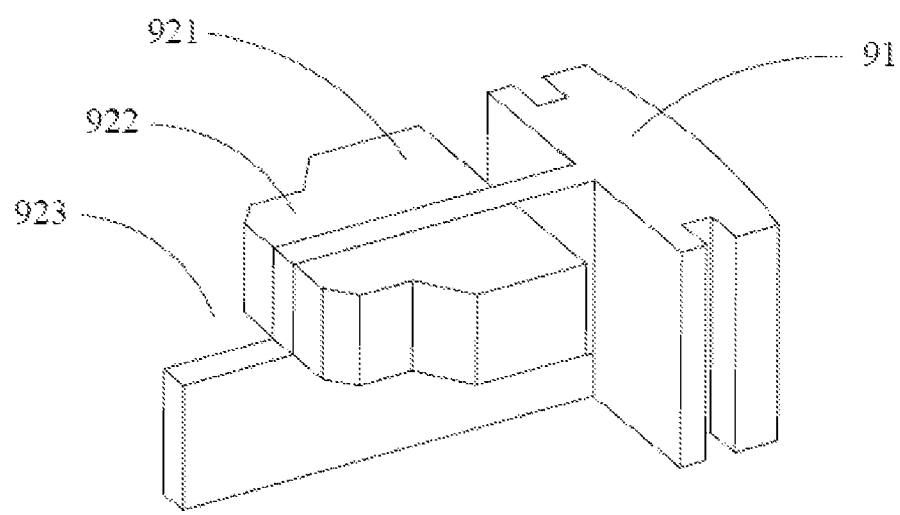
FIG. 15 is an alternative embodiment of the third switching mechanism shown in FIG. 14.

In this embodiment, the first abutting portion 921, the second abutting portion 922 and the abdicating groove 923 are vertically arranged, and the operating portion 91 vertically moves. However, it is understood that the first abutting portion 921, the second abutting portion 922 and the abdicating groove 923 may also be arranged along the mating direction of the input port 80 and the single-voltage output interface, as shown in FIG. 15; then, the first abutting portion 921, the second abutting portion 922 and the abdicating groove 923 move along the mating direction of the input port 80 and the single-voltage output interface under the action of the operation portion 91.

Figure 16:
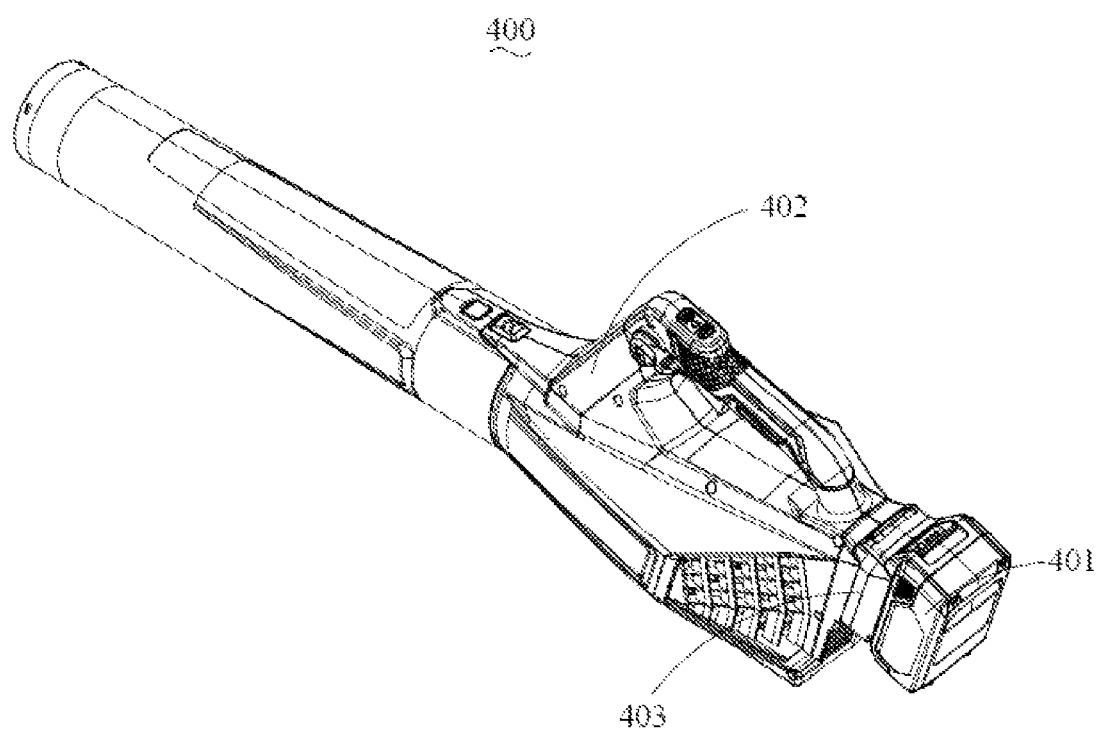
FIG. 16 is a perspective view of a power tool system.

Referring to FIG. 16, the present invention further discloses a tool system 400, which includes a battery pack 401, a power tool 402, and an adapter 403 connecting the battery pack 401 and the power tool 402. The adapter 403 is the adapter 100 or the adapter 200 or the adapter 300. When the battery pack 401 is a single-voltage battery pack, the power tool 402 is a power tool provided with a multi-voltage input interface 10"; when the battery pack 401 is a multi-voltage battery pack, the power tool 402 is a power tool provided with a single-voltage input interface 10'.

Compared with the prior art, the adapters 100, 200 and 300 of the present invention can connect the multi-voltage output interface disposed on the multi-voltage battery pack with the power tool having single-voltage input interface, or connect the single-voltage output interface disposed on the single-voltage battery pack with the power tool having multi-voltage input interface, so that the power tool disposed with single-voltage input interface can be powered by the multi-voltage battery pack, and the power tool disposed with multi-voltage input interface can be powered by the single-voltage battery pack, thereby expanding the application range of the single-voltage battery pack and the multi-voltage battery pack.

Although the present invention has been described in detail with reference to the preferred embodiments, it will be understood by those skilled in the art that various changes may be made and equivalents may be substituted for elements thereof without departing from the spirit and scope of the present invention.

What is claimed is:

1. An adapter, comprising:
    an input port being coupleable with a single-voltage output interface of a single-voltage battery pack or a dual voltage output interface of a dual voltage battery pack;
    an output port electrically connected with the input port and being coupleable with a single-voltage input interface of a first power tool or a dual voltage input interface of a second power tool, the single-voltage output interface of the single-voltage battery pack being coupleable to the single-voltage input interface of the first power tool, the dual voltage output interface of the dual voltage battery pack being coupleable to the dual voltage input interface of the second power tool;
    a switching mechanism being switchable between a first state and a second state;
    a housing for accommodating the input port, the output port and the switching mechanism;
    wherein when the input port is coupled with the single-voltage output interface of the single-voltage battery pack and the switching mechanism is in the first state, the second power tool can be coupled to the output port and powered by the single-voltage battery pack, and when the input port is coupled with the dual voltage output interface of the dual voltage battery pack and the switching mechanism is in the second state, the first power tool can be coupled to the output port and powered by the dual voltage battery pack.

2. The adapter according to claim 1, wherein the input port comprises a first input terminal, a second input terminal, a third input terminal and a fourth input terminal which are arranged in sequence.

3. The adapter according to claim 2, wherein the switching mechanism comprises a base, and an elastic element engaged with the base, and a connecting terminal arranged on the base; when the elastic element is elastically deformed, the connecting terminal is electrically disconnected from the second input terminal and the third input terminal; when the elastic element resets, the connecting terminal is electrically connected with the second input terminal and the third input terminal.

4. The adapter according to claim 2, wherein the switching mechanism comprises a base, an elastic element engaged with the base and a plurality of connecting terminals arranged on the base; the connecting terminals comprise a first connecting terminal and a second connecting terminal; when the elastic element is elastically deformed, the first connecting terminal is electrically disconnected from the first input terminal and the second input terminal, and the second connecting terminal is electrically disconnected from the third input terminal and the fourth input terminal; when the elastic element resets, the first connecting terminal is electrically connected with the first input terminal and the second input terminal, and the second connecting terminal is electrically connected with the third input terminal and the fourth input terminal.

5. The adapter according to claim 2, wherein the switching mechanism comprises a base, an elastic element engaged with the base, and a connecting terminal or a plurality of connecting terminals for engaging with the input port, when the elastic element is elastically deformed, the base moves along a mating direction of the input port and the single-voltage output interface or along a vertical direction.

6. The adapter according to claim 2, wherein the switching mechanism comprises a button partially positioned outside the housing and a switching terminal mounted on the button and engaged with the input terminal group; when the button is pressed, the switching terminal engages with the second input terminal and the third input terminal under an action of the button so that the second input terminal and the third input terminal are electrically connected.

7. The adapter according to claim 2, wherein the switching mechanism comprises a button partially positioned outside the housing and a plurality of switching terminal which is arranged on the button and engaged with the input terminal group; the switching terminals comprise a first switching terminal and a second switching terminal; when the button is pressed, the first switching terminal engages with the first input terminal and the second input terminal under an action of the button so that the first input terminal and the second input terminal are electrically connected, and the second switching terminal engages with the third input terminal and the fourth input terminal under an action of the button so that the third input terminal and the fourth input terminal are electrically connected.

8. An adapter as claimed in claim 2, wherein the switching mechanism comprises a button partially positioned outside the housing, and a switching terminal or a plurality of switching terminals for engaging with the input terminal group, the button moves along the mating direction of the input port and the dual voltage output interface or along a vertical direction.

9. The adapter according to claim 2, wherein the second input terminal is provided with a second contact terminal on an end thereof away from the single-voltage output interface or the dual voltage output interface; the third input terminal is provided with a third contact terminal on an end thereof away from the single-voltage output interface or the dual voltage output interface; the switching mechanism is provided with an abdicating groove; the second contact terminal elastically engages with the third contact terminal by the abdicating groove and makes the second input terminal and the third input terminal be electrically connected.

10. The adapter according to claim 9, wherein the switching mechanism is also provided with a first abutting portion; when the first abutting portion is located between the second contact terminal and the third contact terminal, the second contact terminal elastically contacts against the first input terminal, and the third contact terminal elastically engages with the fourth input terminal.

11. The adapter according to claim 9, wherein the switching mechanism is also provided with a second abutting portion; when the second abutting portion is located between the second contact terminal and the third contact terminal, the second contact terminal is electrically disconnected from the first input terminal and the third input terminal, and the third contact terminal is electrically disconnected from the second input terminal and the fourth input terminal.

12. An adapter according to claim 9, wherein the switching mechanism moves along a vertical direction or a mating direction of the input port and the single-voltage output interface.

13. The adapter according to claim 1, wherein the input port comprises a fixedly arranged input terminal group and a movably arranged input signal terminal; when the input port mates with the single-voltage output interface, the input terminal group is inserted into the single-voltage output interface, and the input signal terminal partially enters the adapter so that the input signal terminal is electrically disconnected from the single-voltage output interface; when the input port mates with the dual voltage output interface, the input terminal group and the input signal terminal are inserted into the dual voltage output interface.

14. The adapter according to claim 13, wherein the input terminal group comprises a first input terminal, a second input terminal, a third input terminal and a fourth input terminal which are arranged in sequence, and the input signal terminal is positioned between the second input terminal and the third input terminal; the output port comprises an output terminal group and an output signal terminal; the output terminal group comprises a first output terminal, a second output terminal, a third output terminal and a fourth output terminal which are arranged in sequence, and the output signal terminal is positioned between the second output terminal and the third output terminal; the first output terminal is connected to the first input terminal, the second output terminal is connected to the input signal terminal, the fourth output terminal is connected to the fourth input terminal, and the second input terminal is connected to the output signal terminal.

15. An adapter as claimed in claim 5, wherein the input port further comprises an input signal terminal disposed on the base.

16. A power tool system, comprising:
  a single-voltage battery pack having a single-voltage output interface, the single-voltage battery pack configured to output only one kind of voltage;
  a first power tool having a single-voltage input interface being coupleable with the single-voltage output interface of the single-voltage battery pack;
  a dual voltage battery pack having a dual voltage output interface, the dual voltage battery pack configured to output two different kinds of voltages;
  a second power tool having a dual voltage input interface being coupleable with the dual voltage output interface of the dual voltage battery pack; and
  an adapter comprising:
    an input port being coupleable with the single-voltage output interface of the single-voltage battery pack or the dual voltage output interface of the dual voltage battery pack;
    an output port electrically connected with the input port and being coupleable with the single-voltage input interface of the first power tool or the dual voltage input interface of the second power tool;
    a switching mechanism being switchable between a first state and a second state;
    a housing for accommodating the input port, the output port and the switching mechanism;
  wherein when the input port is coupled with the single-voltage output interface of the single-voltage battery pack and the switching mechanism is in the first state, the second power tool is coupled to the output port and powered by the single-voltage battery pack, and when the input port is coupled with the dual voltage output interface of the dual voltage battery pack and the switching mechanism is in the second state, the first power tool is coupled to the output port and powered by the dual voltage battery pack.

* * * * *